Patented Mar. 17, 1953

2,632,008

UNITED STATES PATENT OFFICE 2,632,008

PROCESS FOR CONVERTING SAPOGENINS INTO PSEUDOSAPOGENINS

David H. Gould, Palisades Park, and Emanuel B. Hershberg, West Orange, N. J., assignors to Schering Corporation, Bloomfield, N. J., a corporation of New Jersey No Drawing. Application December 26, 1950, Serial No. 202,822

20 Claims. (Cl. 260—239.55)

The present invention relates to an improved process for the conversion of sapogenin compounds into their pseudo-forms, which can be converted by known procedures into steroid hormones and other physiologically active substances.

In the patent to Marker No. 2,352,852, a number of procedures are described for converting sapogenin compounds into their pseudo-forms by heating the sapogenin compounds with an organic acid anhydride at high temperatures for long periods of time to obtain the corresponding pseudo-sapogenins. As stated on page 2, column 1, lines 42 to 46, the conversion is effected under conditions more vigorous than those required merely for acylation. When the boiling point of the anhydride is below about 175° C., as is the case with acetic and propionic anhydrides, the process must take place within a bomb tube and under superatmospheric pressure to attain a temperature of about 195–200° C., under which conditions the process requires a period of about 10 hours of reaction time. With anhydrides boiling in the neighborhood of 200° C., as is the case with butyric anhydride, the use of super-atmospheric pressure is not necessary to attain the required high reaction temperature, but the reaction time is still high (8 hours) and the yield is low. With solid anhydrides, like succinic anhydride, the bomb tube must again be used since the distilled anhydride would solidify in the reflux condenser. In general, the patented process requires a minimum temperature of 195° C. and the reaction time of 8 to 10 hours to effect the desired conversion.

A similar process is described by Marker and Rohrmann, J. A. C. S. 61, 3592 (1939); 62, 518 (1940); United States Patents 2,352,850 and 2,352,851, and British Patent 552,047. These patents and publications indicate that where the conversion into pseudo-form is to be effected with, for example, acid anhydrides, such as acetic anhydride, the process must be conducted in an autoclave at 175–250° C. and at 60 to 70 lbs. pressure for 7 to 10 hours.

We have found that sapogenin compounds, particularly those of the diosgenin type and usually having a "spiro ketal" side chain, may be isomerized readily to the so-called pseudo-sapogenin compounds in a considerably shorter period of time than heretofore and at atmospheric pressure, by refluxing the sapogenin compound with an organic acid anhydride in the presence of one or more acidic catalysts. In general, the catalyst preferably employed in any particular procedure will be one which will not distill off completely during the course of the reaction. By the use of such acidic catalysts the temperature necessary for effecting the conversion is considerably lowered, and even at such lower temperature the time required for the reaction is reduced to half or less than half the time required by the higher temperature procedures described in the above named patents and publications.

We have found that a great variety of acidic catalysts are effective in our process. They include the common inorganic acids and acid-reacting inorganic salts of metals and non-metals; they include further various organic acids, by which term we include also the organic sulfonic acids. In general, the stronger acids and more strongly acid-reacting halides are preferred. Among the acid-reacting substances which we have found to be effective in our process are hydrochloric, sulfuric, perchloric acids, boron trifluoride, zinc chloride, aluminum chloride, stannic chloride, ferric chloride, antimony chloride, boron chloride, sulfuryl, thionyl chlorides, phosphorus halides and oxyhalides, such as phosphorus pentabromide, trichloride and oxychloride, p-toluenesulfonic acid, mixed alkane sulfonic acids, such as methyl and ethyl sulfonic acids, acetyl chloride, di- and tri-chloracetic acids, oxalic acid and other acid-reacting substances. The reaction time will vary with the type of catalyst employed and also with the temperature and will in certain instances be as low as one-half hour but in general will be of the order of 3 or 4 hours. With compounds which are exceptionally difficult to isomerize, the needed reaction time may be longer, but in all cases the process is conducted at atmospheric pressure and the reaction time and/or reaction temperature will be lower than heretofore required in the absence of the acidic catalysts, and with better yields.

Our preferred conversion agent is acetic anhydride, but other anhydrides, such as propionic, butyric, and so forth, can be employed, and even solid anhydrides, such as benzoic, phthalic and succinic can be employed, in which case the reaction mixture includes a solvent for the solid anhydride of sufficiently high boiling point so as to prevent distillation or sublimation of the anhydride. There may also be used in our process substances yielding anhydrides or ketenes, such as isopropenyl acetate.

The sapogenin compounds that can be converted by our process into their pseudo-forms include, as already indicated, the sapogenins themselves and likewise their derivatives in which the reactive substituents in the steroid nucleus have been altered or removed. These include the esters and polyesters, like the acetates, propionates and benzoates, the ethers, such as methyl, ethyl and benzyl ethers, the ketones obtained by oxidation of the nuclear hydroxyl groups, the halides obtained by the replacement of the hydroxyl group or groups with chlorine and bromine, etc.

It will be apparent from the foregoing that our process presents important advantages over those heretofore employed. As compared with the processes employing an autoclave, the present process eliminates the cost of the autoclave and the expensive and complicated control equipment necessary to prevent dangerous pressures from arising in the autoclave. Operation under superatmospheric pressure, in addition, usually limits the size of the batch and is frequently difficult to control. The temperature employed in the autoclave process is more or less critical within the range of 190–200° C., and this temperature and the attendant pressure are difficult to maintain in large commercial operations without extensive control equipment. In the present process, the temperature is automatically limited by the refluxing "liquid," and the only control necessary is the time of treatment, which is relatively simple.

The invention will be further described in the following examples which are presented solely for purposes of illustration and not as indicating the scope of the invention.

Example 1

A warm suspension of 200 g. of diosgenin acetate in 400 cc. of acetic anhydride is treated with 50 g. of aluminum chloride and the mixture is refluxed for thirty minutes. The reaction mixture is then filtered and oxidatively degraded as usual. After saponification and acetylation a 33% yield of pregnadienolone acetate is obtained.

Example 2

Fifty grams of diosgenin acetate in 100 cc. of butyric anhydride are treated with 10 g. of zinc chloride granules and the mixture is stirred on the steam bath for 6 hours. The reaction mixture is then neutralized, oxidized, saponified and acetylated in the usual manner to give 25% yield of pregnadienolone acetate.

Example 3

Twenty grams of hecogenin acetate are suspended in 40 cc. of acetic anhydride and 15 cc. of conc. HCl are added. The mixture is refluxed for 2 hours, then cooled, oxidatively degraded, and acetylated as usual. The crystalline product is 16-allopregnen-3$\beta$-ol-12,20-dione acetate, M. P. 171–5°, $[\alpha]_D^{20} = +130°$.

Example 4

Fifty grams of crude diosgenin acetate are suspended in 100 cc. of acetic anhydride and warmed slightly with stirring. To this mixture are added 10 g. of p-toluenesulfonic acid, and heating is increased until the solution boils and the boiling point is then maintained under reflux for 4 hours. The cooled solution can be oxidized and dehydrated as usual to give pregnadienolone acetate, or it may be decomposed in water. The crude product is taken up in ether, the solution is washed neutral, dried and evaporated. The residue is crystallized from methanol to give pseudo-diosgenin diacetate, M. P. 98–100° C.

Example 5

The warm suspension of diosgenin acetate in acetic anhydride prepared as in Example 4 is treated with 5 g. of aluminum chloride and refluxed for 4 hours. The mixture is oxidized and dehydrated as usual to give 13 g. of pregnadienolone acetate, M. P. 169–173° C.

Example 6

A warm suspension of 50 g. of ricogenin in excess acetic anhydride is treated with 20 cc. of HCl(conc.) and the solution is refluxed for 3 hours. The solution is decomposed by pouring into water, and extracted with ether. The ether extract is concentrated and the residue is saponified with alcoholic KOH. The solution is poured into water and the precipitate is filtered off, washed well with water and dried. The product is pseudoricogenin, M. P. 220–222° C.

The following formulae indicate by way of example a synthesis of which the process of the present invention forms a part, the formulae of the different sapogenins and corresponding pseudo compounds being those considered the most likely at the present time, and even if they should prove not entirely accurate show graphically the type of change effected by the present invention.

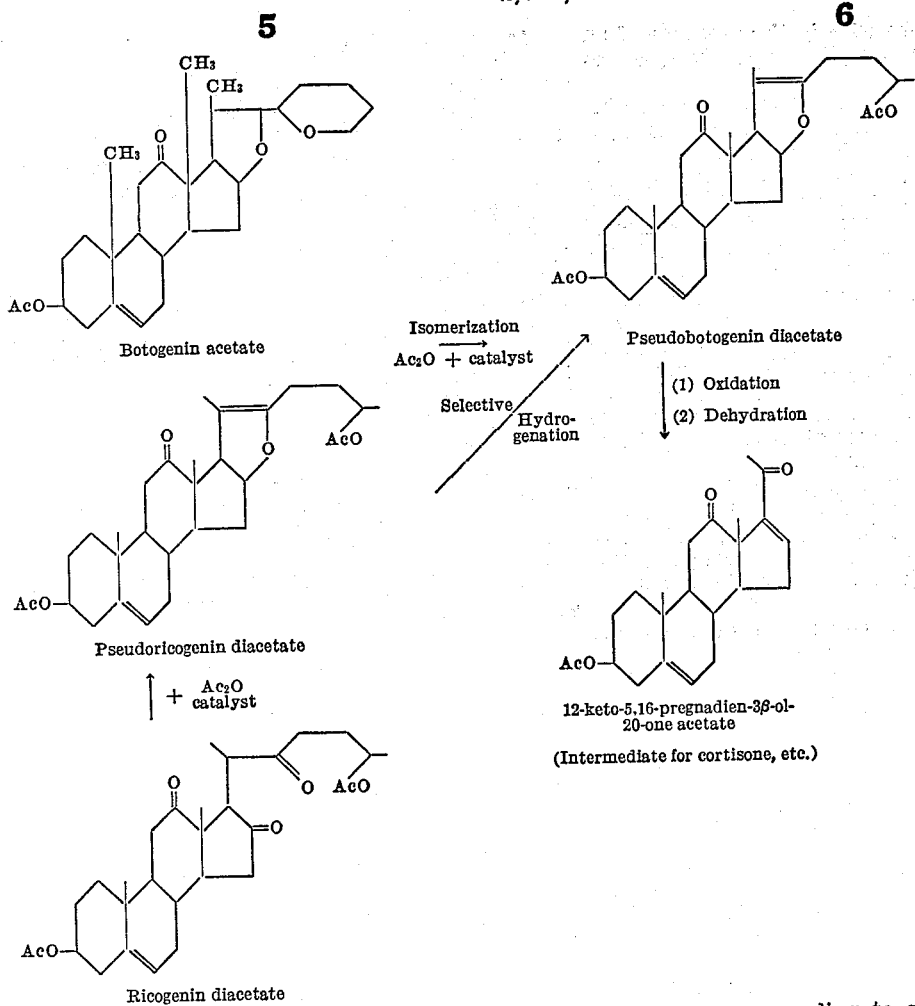

It will be seen from the foregoing that we have provided a simple and inexpensive process for the conversion of sapogenins into "pseudosapogenins" which in turn may be oxidized and dehydrated into $\Delta^{16}$-20-keto steroids, and that the process may be applied to derivatives of sapogenins in which the original "side chain" or 16,17- grouping is retained.

As will be apparent, the present invention is applicable to sapogenins and hydrolyzed saponins generally, and their nuclear substitution products. Thus, in similar fashion, sarsapogenin, tigogenin, chlorogenin, manogenin, kammogenin, gitogenin, digitogenin, and other sapogenins and their derivatives, like sarsapogenone-3, tigogenone, desoxy-sarsasapogenin, the 3-keto-$\Delta^{4,5}$- compound derived from diosgenin, as well as unhydrolyzed saponins, can be converted into the pseudo form. It will be understood that while the above examples employ the acetates, because of their greater availability and ease of formation, other esters can be employed, preferably the lower fatty acid esters and the benzoyl ester.

We claim:

1. Process for the conversion of sapogenin compounds into the pseudo-sapogenin forms, which comprises heating a member of the class consisting of sapogenins and their corresponding ketones, esters, ethers and desoxy compounds, with an organic acid anhydride under atmospheric pressure and in the presence of an acidic catalyst at a temperature above room temperature but below 175° C. until the 26-acyloxy derivative of the pseudo form of the sapogenin is obtained.

2. Process according to claim 1, wherein the reaction is conducted under reflux with an anhydride boiling normally below 175° C.

3. Process according to claim 1, wherein the anhydride is acetic anhydride.

4. Process according to claim 1, wherein the anhydride is propionic anhydride.

5. Process according to claim 1, wherein the acidic catalyst is a metal chloride.

6. Process according to claim 1, wherein the acidic catalyst is an arylsulfonic acid.

7. Process according to claim 1, wherein the acidic catalyst is p-toluene sulfonic acid.

8. Process according to claim 1, wherein the acidic catalyst is an inorganic acid.

9. Process according to claim 1, wherein the acidic catalyst is hydrochloric acid.

10. Process according to claim 1, wherein the heating is conducted for no more than about 4 hours.

11. Process for the conversion of sapogenins into pseudo-sapogenins, comprising heating a member of the group consisting of sapogenins and their corresponding ketones, esters, ethers and desoxy compounds, at atmospheric pressure with a fatty acid anhydride in the presence of an acid-reacting material until the 26-acyloxy derivative of the pseudo form of the sapogenin compound is obtained.

12. Process for the conversion of sapogenins into pseudo-sapogenins, comprising heating a member of the class consisting of sapogenins and their corresponding ketones, esters, ethers and desoxy compounds, at atmospheric pressure with an organic acid anhydride in the presence of an acid-reacting material until the acyloxy-pseudo-sapogenin is obtained.

13. Process for the conversion of sapogenins into pseudo-sapogenins, comprising refluxing a member of the class consisting of sapogenins and their corresponding ketones, esters, ethers and desoxy compounds, in a liquid organic acid anhydride at atmospheric pressure in the presence of an acid-reacting material until the acyloxy-pseudo-sapogenin is obtained.

14. Process for the conversion of sapogenins into pseudo-sapogenins, comprising refluxing a member of the class consisting of sapogenins and their corresponding ketones, esters, ethers and desoxy compounds, in a liquid aliphatic acid anhydride at atmospheric pressure in the presence of an acid-reacting material until the acyloxy-pseudo-sapogenin is obtained.

15. Process for the conversion of diosgenin into pseudo-diosgenin, which comprises suspending diosgenin acetate in acetic anhydride containing p-toluene sulfonic acid and refluxing the mixture for about 4 hours to produce pseudo-diosgenin diacetate.

16. Process for the conversion of diosgenin into pseudo-diosgenin, which comprises suspending diosgenin acetate in acetic anhydride containing aluminum chloride and refluxing the mixture for about 1 to 4 hours to produce pseudo-diosgenin diacetate.

17. Process for the conversion of ricogenin into pseudo-ricogenin, which comprises heating a mixture of ricogenin, acetic anhydride, and hydrochloric acid under reflux for about 3 hours to produce pseudo-ricogenin diacetate.

18. Process for the conversion of diosgenin into pseudo-diosgenin, which comprises refluxing a diosgenin ester with about 25% of its weight of aluminum chloride in a lower fatty acid anhydride for about 30 minutes.

19. Process according to claim 1, wherein a 3-keto sapogenin is employed as the starting compound.

20. Process according to claim 1, wherein a 3-keto-$\Delta^{4,5}$-sapogenin is employed as the starting compound.

DAVID H. GOULD.
EMANUEL B. HERSHBERG.

No references cited.